(12) United States Patent
Chiasson

(10) Patent No.: US 10,926,947 B1
(45) Date of Patent: Feb. 23, 2021

(54) WEATHERPROOF ENCLOSURE SYSTEM

(71) Applicant: Todd Bruce Chiasson, Grande Prairie (CA)

(72) Inventor: Todd Bruce Chiasson, Grande Prairie (CA)

(*) Notice: Subject to any disclaimer, the term of this patent is extended or adjusted under 35 U.S.C. 154(b) by 0 days.

(21) Appl. No.: 16/392,531

(22) Filed: Apr. 23, 2019

(51) Int. Cl.
*B65D 88/00* (2006.01)
*B65D 88/22* (2006.01)
*B60P 7/08* (2006.01)

(52) U.S. Cl.
CPC .......... *B65D 88/005* (2013.01); *B65D 88/22* (2013.01); *B60P 7/08* (2013.01)

(58) Field of Classification Search
CPC .......... B65D 88/005; B65D 88/22; B60P 7/08
USPC .............................. 224/404, 497, 318, 42.34
See application file for complete search history.

(56) References Cited

U.S. PATENT DOCUMENTS

| | | | | |
|---|---|---|---|---|
| 3,000,418 A * | 9/1961 | Bitting | ............... | B60R 9/055 180/53.8 |
| 3,000,419 A * | 9/1961 | Morrison | ............... | B60R 9/055 224/318 |
| 4,050,614 A * | 9/1977 | Simpson | ............... | B60R 9/065 224/328 |
| 4,332,265 A * | 6/1982 | Baker | ............... | B60P 3/34 135/115 |
| 4,718,583 A * | 1/1988 | Mullican | ............... | B60R 9/00 206/527 |
| 4,779,779 A * | 10/1988 | Haugland | ............... | B60R 9/065 224/318 |
| 4,877,281 A * | 10/1989 | Altmann | ............... | B60R 5/04 296/39.1 |
| 5,050,924 A * | 9/1991 | Hansen | ............... | B60P 7/0876 296/100.15 |
| 5,096,107 A * | 3/1992 | VanSon | ............... | B60R 9/055 224/309 |
| 5,378,034 A * | 1/1995 | Nelsen | ............... | B60J 7/102 220/666 |
| D391,920 S * | 3/1998 | Dempsey, Jr. | ............... | D12/423 |
| 5,868,295 A * | 2/1999 | Carriere | ............... | B60R 9/00 224/404 |
| 6,003,929 A * | 12/1999 | Birdsell | ............... | B60P 7/0876 150/166 |
| 6,105,842 A * | 8/2000 | Cesare | ............... | B60R 13/01 224/404 |

(Continued)

*Primary Examiner* — Peter N Helvey
(74) *Attorney, Agent, or Firm* — Gulf Coast Intellectual Property Group

(57) ABSTRACT

A weatherproof container configured to be secured within an open style utility trailer wherein the weatherproof container is operable to protect objects disposed therein from the elements. The weatherproof container includes a body said body having a plurality of walls, a bottom and a top forming an interior volume. The plurality of walls having circumferentially disposed thereon expansion sections that are operable to provide height adjustment of the body. The expansion sections include an upper perimeter edge and lower perimeter edge with an expansion member integral therebetween. The body further includes at least one access seam operable to provide entry into the interior volume of the body. The body further includes a plurality of reinforcement straps on the top thereof. A plurality of access apertures are further provided being journaled through said plurality of walls. Tie down members are present to secure the body to a trailer.

11 Claims, 2 Drawing Sheets

(56) References Cited

U.S. PATENT DOCUMENTS

| | | | | |
|---|---|---|---|---|
| 6,244,482 B1 * | 6/2001 | Gyarmaty | | B60R 9/055 224/318 |
| 6,257,470 B1 * | 7/2001 | Schaefer | | B60R 9/055 224/318 |
| 6,401,995 B1 * | 6/2002 | Yuille | | B60R 7/02 220/483 |
| 6,474,022 B1 * | 11/2002 | Double | | B60J 7/10 135/115 |
| 6,536,827 B2 * | 3/2003 | Oswald | | B60R 13/01 296/39.1 |
| 6,543,659 B2 * | 4/2003 | Blair | | B60R 9/045 220/9.2 |
| 6,772,926 B2 * | 8/2004 | Eichele | | B60R 9/045 224/316 |
| 6,892,912 B1 * | 5/2005 | MacNeil | | B60R 9/055 224/318 |
| 8,568,030 B2 * | 10/2013 | Martin | | B60P 7/0876 224/400 |
| 9,169,061 B2 * | 10/2015 | Blanchard | | B65D 88/1618 |
| 9,919,658 B1 * | 3/2018 | Walther | | B60R 9/06 |
| 10,214,153 B2 * | 2/2019 | Dooling | | B60R 9/065 |
| 10,391,947 B2 * | 8/2019 | Dexter | | B60R 9/055 |
| 10,457,192 B1 * | 10/2019 | Heimstra | | B60P 7/0876 |
| 2005/0279436 A1 * | 12/2005 | McMillen | | B62J 19/00 150/167 |
| 2006/0055200 A1 * | 3/2006 | Yang | | B60J 11/00 296/136.07 |
| 2006/0180622 A1 * | 8/2006 | Dexter | | B60R 9/055 224/314 |
| 2011/0129169 A1 * | 6/2011 | Dozier | | B60P 7/0876 383/105 |
| 2012/0187709 A1 * | 7/2012 | Wise | | B60R 13/01 296/39.2 |

\* cited by examiner

WEATHERPROOF ENCLOSURE SYSTEM

FIELD OF THE INVENTION

The present invention relates generally to storage systems, more specifically but not by way of limitation, a weatherproof storage system configured to be disposed in an open utility trailer or the like wherein the present invention provides expandable and weatherproof storage of objects of alternate sizes and types.

BACKGROUND

As is known in the art, it is common to move furniture, building supplies and numerous other objects utilizing devices such as utility trailers. Utility trailers are typically small trailers that are designed to carry light loads and are often used by individuals for both commercial and personal purposes. While some utility trailers are box style and provide protection for the objects disposed therein, other types of utility trailers are open and as such any objects therein are exposed to elements such as but not limited to wind and rain. While some objects transported by these trailers can accommodate the aforementioned elements, many objects that need to be transported can not be subjected to these elements.

One issue with conventional techniques of protecting objects being transported in conventional open style utility trailers is ability to provide protection from rain. Typically, it is common for individuals to utilize tarps or similar devices to cover objects disposed in an open style utility trailer when they cannot be subjected to rain and other elements. These tarps while somewhat effective ultimately do not provide complete protection from rain and other elements and often leak causing damage to the objects. Additionally, while tarps are available in alternate sizes, it can often be the situation where an individual may not have an appropriate sized tarp to cover the object and will have to leave an object partially exposed. Again, an undesirable scenario and potential risk to the object being transported in the open style utility trailer.

Accordingly, there is a need for a weatherproof enclosure that is configured to be disposed within the interior of an open style utility trailer that is expandable and operable to provide protection for a plurality of alternate size objects during towing of the trailer.

SUMMARY OF THE INVENTION

It is the object of the present invention to provide a weatherproof storage container that is configured to provide protection from environmental elements to objects disposed therein wherein the weatherproof storage container includes a body having a plurality of walls configured to define the interior volume thereof.

Another object of the present invention is to provide a storage container that is operable to receive and store a plurality of objects within the interior volume thereof wherein the storage container is configured to be disposed within an open style utility trailer.

A further object of the present invention is to provide a weatherproof storage container that is configured to provide protection from environmental elements to objects disposed therein wherein the walls of the present invention include a plurality of expansion sections that are configured to provide alteration of the height of the body of the present invention.

Still another object of the present invention is to provide a storage container that is operable to receive and store a plurality of objects within the interior volume thereof wherein the body of the present invention further includes integrated straps disposed on the top thereof.

An additional object of the present invention is to provide a weatherproof storage container that is configured to provide protection from environmental elements to objects disposed therein that further includes at least one access member wherein the access member is formed in the front wall of the body.

Yet a further object of the present invention is to provide a storage container that is operable to receive and store a plurality of objects within the interior volume thereof wherein the expansion section further include zippers to provide the transition from a closed position to an expanded position.

Another object of the present invention is to a provide a weatherproof storage container that is configured to provide protection from environmental elements to objects disposed therein wherein the body further includes apertures formed therein wherein the apertures further includes weatherproof flaps superposed thereto.

An alternate object of the present invention is to provide a storage container that is operable to receive and store a plurality of objects within the interior volume thereof wherein the bottom portion of the body is manufactured from a more rigid material such as but not limited to heavy canvas.

Still a further object of the present invention is to provide a weatherproof storage container that is configured to provide protection from environmental elements to objects disposed therein wherein the bottom of the body further includes a plurality of tie down members configured to secure the body to a trailer.

An additional object of the present invention is to provide a storage container that is operable to receive and store a plurality of objects within the interior volume thereof wherein the upper portion of the body is manufactured from a flexible weatherproof material such as but not limited to nylon.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
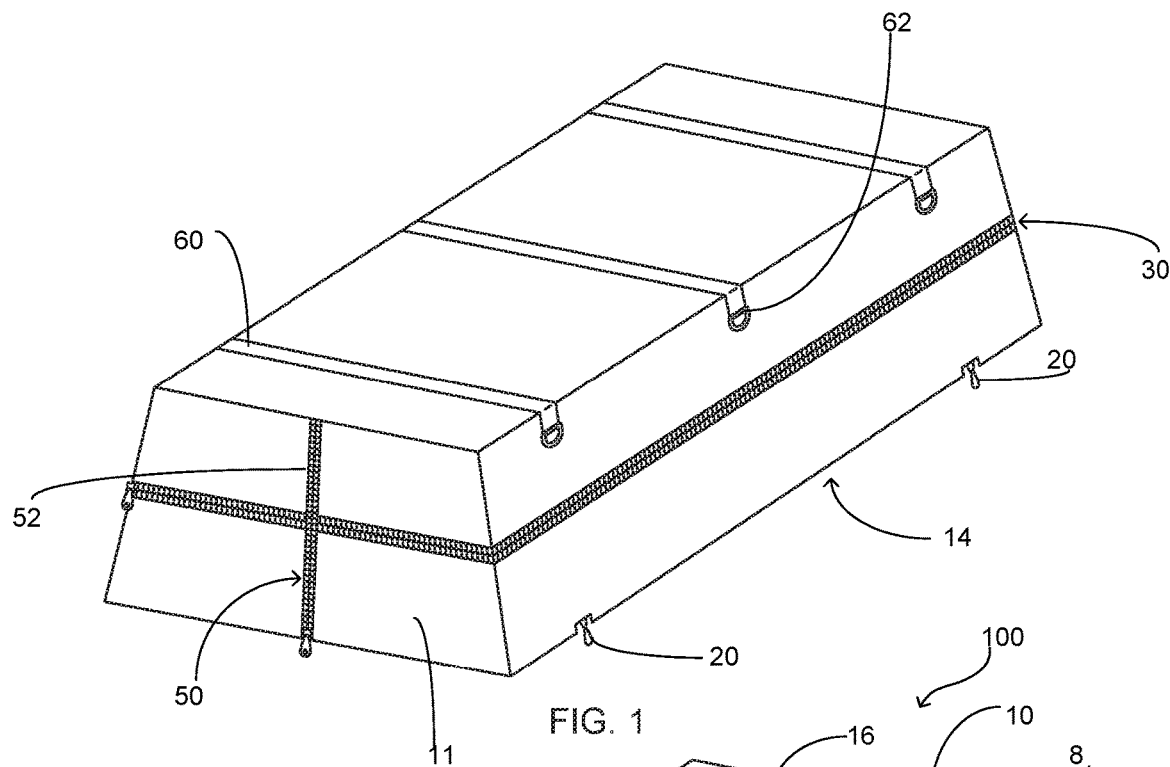
FIG. 1 is perspective view of an embodiment of the present invention.

Referring now to the drawings submitted herewith, wherein various elements depicted therein are not necessarily drawn to scale and wherein through the views and figures like elements are referenced with identical reference numerals, there is illustrated a weatherproof container 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to the Figure submitted herewith, the weatherproof container 100 includes a body 10. The body 10 includes a lower section 5 and an upper section 8 that are contiguously formed. The body 10 includes a plurality of walls 12, a bottom 14 and a top 16 that are integrally formed so as to create an interior volume. While the body 10 is illustrated herein as being generally rectangular in shape, it is contemplated within the scope of the present invention that the body 10 could be formed in alternate shapes. Furthermore, it should be understood within the scope of the present invention that alternate shapes would require an alternate quantity of walls 12 and that it is contemplated within the scope of the present invention that the body 10 could be formed from as few as one wall or more than four walls 12.

The bottom 14 further includes tie down members 20. The tie down members 20 are secured to the bottom utilizing suitable durable techniques and are configured to provide securing of the body 10 to the exemplary trailer 99. The tie down members 20 are disposed around the perimeter of the bottom 14 and it is contemplated within the scope of the present invention that various quantities of the tie down members 20 could be secured to the bottom 14 of the body 10.

The walls 12 of the body 10 have integrally formed therein expansion sections 30. The expansion sections 30 are configured to provide variation of the height of the body 10 so as to adjust to the objects that are disposed within the interior volume of the weatherproof container 100. It is desired during utilization of the weatherproof container 100 that the height thereof is altered to accommodate objects disposed therein and further configure the height of the body 10 so as to minimize any excess height. The expansion sections 30 include an upper perimeter edge 32 and a lower perimeter edge 34. The expansion section 30 is circumferentially present around the entire body 10 such that the expansion section 30 is present on every wall 12. The expansion section 30 is configured to provide a first position and a second position thereof. The upper perimeter edge 32 and the lower perimeter edge 34 are configured with mateable fasteners 35 that are operable to provide the transition intermediate the first position and the second position of the expansion section 30. While the fasteners 35 are illustrated herein as being zippers, it should be understood within the scope of the present invention that the fasteners 35 could be alternate conventional fasteners in place of zippers.

The expansion section 30 includes expansion member 40. Expansion member 40 is intermediate the upper perimeter edge 32 and the lower perimeter edge 34 and is operable to provide coupling thereof. The expansion member 40 includes a lower edge and an upper edge (not particularly illustrated herein) that are secured to the interior surface of the walls 12 proximate the upper perimeter edge 32 and lower perimeter edge 34. The expansion member 40 is manufactured so as to have a desired height wherein upon the fasteners 35 being decoupled the wall 12 of the body 10 is extendible based on the height of the expansion member 40. In the second position the fasteners 35 are uncoupled and the expansion member 40 can be extended so as to increase the overall height of the weatherproof container 100. While no particular height of the expansion member 40 is required, good results have been achieved utilizing a height that is approximately two feet. The expansion member 40 is secured to the interior surface of the walls 12 utilizing suitable durable techniques such as but not limited to stitching or welding.

As illustrated herein, it is contemplated within the scope of the present invention that the weatherproof container 100 could have one expansion section 30 or more than one expansion section 30. It should be further understood within the scope of the present invention that the weatherproof container 100 could have expansion sections 30 of alternate heights. The body 10 further includes access seam 50 formed on the front wall 11 of the body 10. Access seam 50 provides access to the interior volume of the body 10. Access seam 50 extends intermediate the top 16 and bottom 14 and includes a fastener 52 that is operable to provide separation of the access seam 50 so as to provide entry to the interior volume of the body 10. While the fastener 52 is illustrated herein as being a zipper, it should be understood by those skilled in the art that the fastener 52 could be manufactured from alternate conventional fasteners that are configured to provide opening and closing of the access seam 50. While one access seam 50 is illustrated herein on the front wall 11, it is contemplated within the scope of the present invention that the body 10 could be configured with alternate quantities of access seams 50 wherein the access seams 50 could be formed on alternate walls 12.

Integrated into the top 16 of the body 10 are reinforcement straps 60. The reinforcement straps 60 are integrally secured to the top 16 utilizing suitable durable technique and extend intermediate opposing sides of the body 10. The reinforcement straps 60 include keeper 62 secured to the end thereof wherein the keeper 62 is configured to be operably coupled to a tie down such as but not limited to a rope of strap. The reinforcement strap 60 provides an area of force distribution for a tie off wherein the reinforcement strap 60 distributes the force of from being secured to a strap or similar item wherein the force and/or pressure is distributed across the top 16 along the reinforcement strap 60 as opposed to a single point like a conventional grommet. This reduces the probability of damage to the body 10 during use thereof. While three reinforcement straps 60 are illustrated herein, it is contemplated within the scope of the present invention that the body 10 could have more or less than three reinforcement straps 60.

Figure 2:
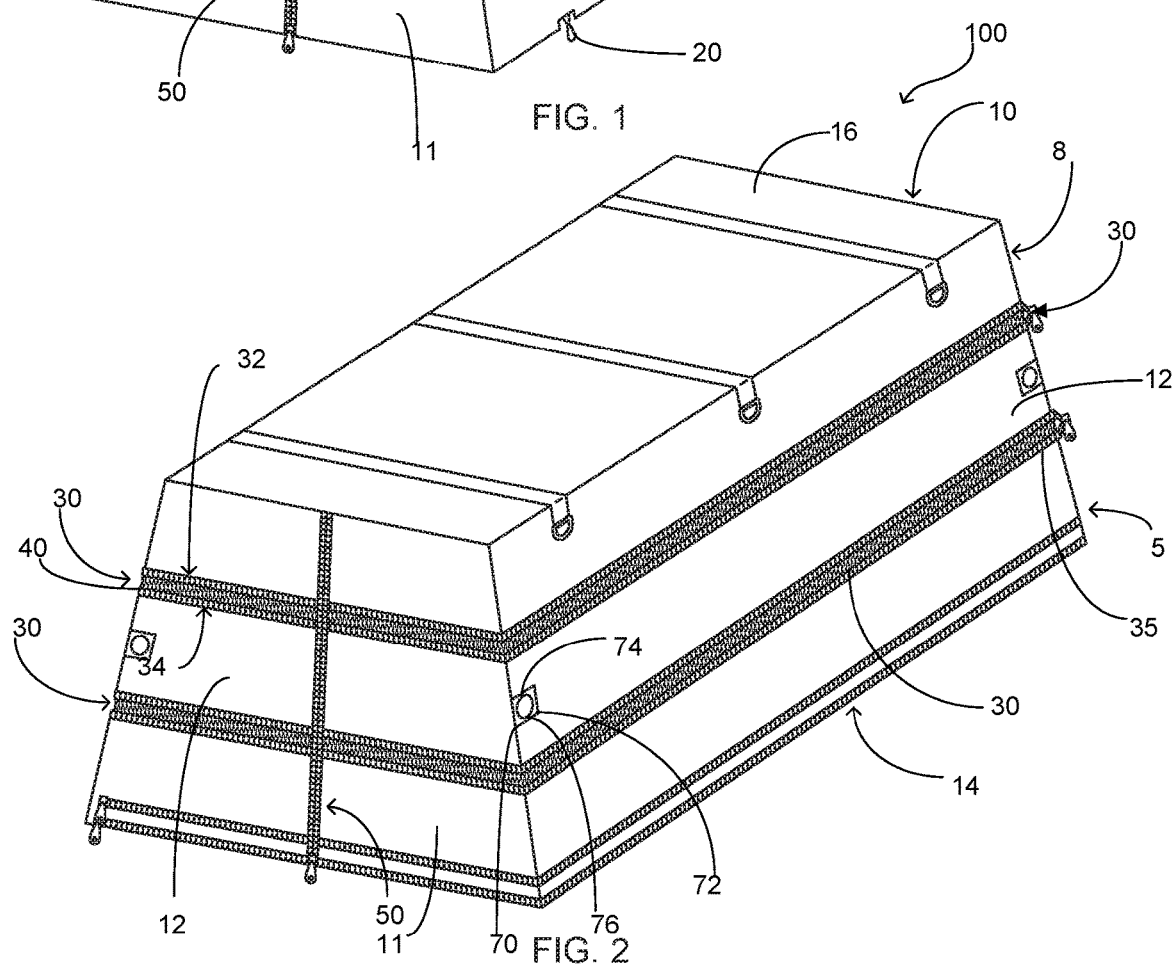
FIG. 2 is a perspective view of a larger embodiment of the present invention.
Figure 3:
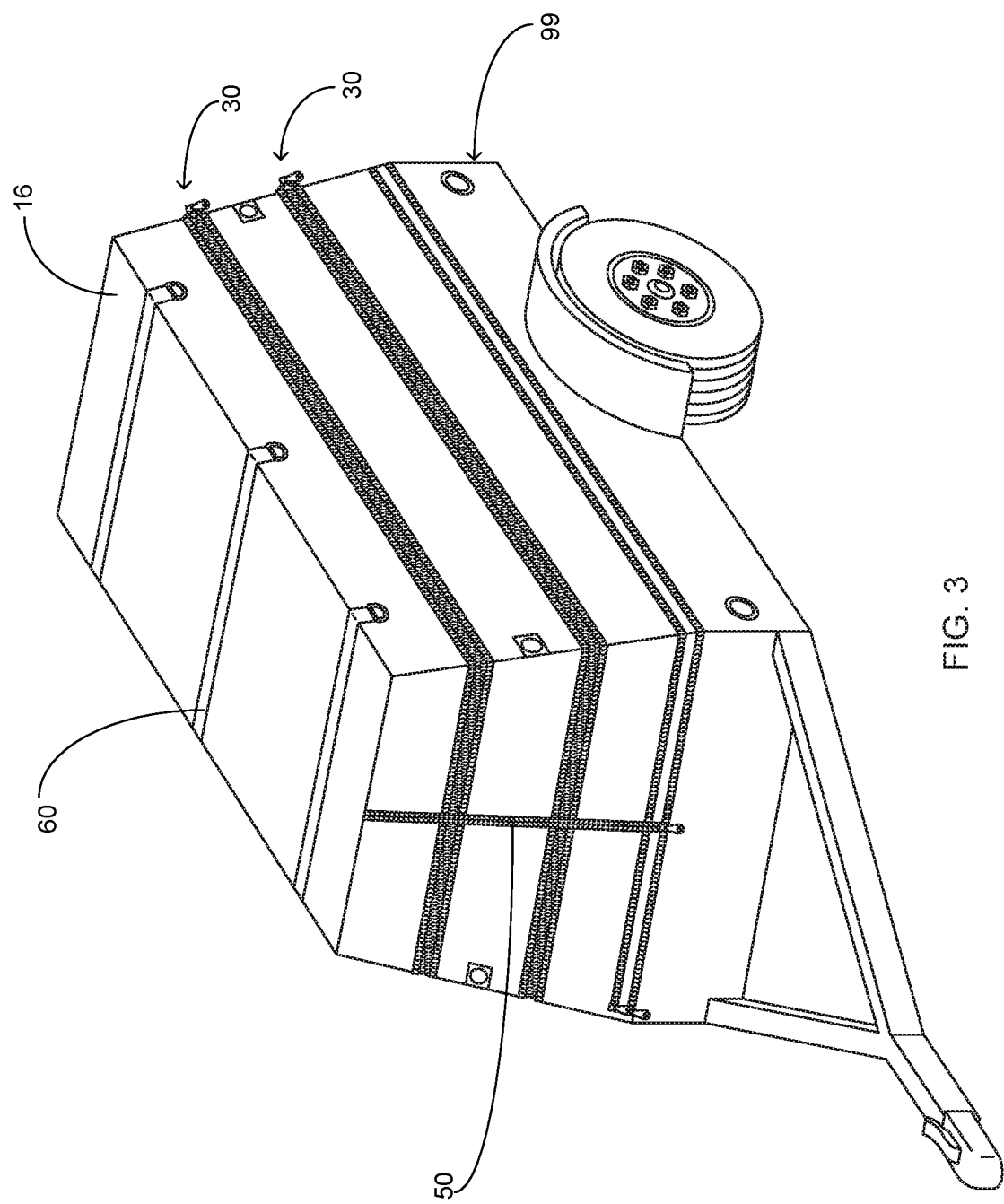
FIG. 3 is a perspective view of an embodiment of the present invention disposed in a utility trailer.

As shown in FIGS. 2 and 3 submitted herewith, the weatherproof container 100 includes access apertures 70. The access apertures 70 provide access for a rope, strap or similar item to be secured to an object within the interior volume of the body 10 and have a portion thereof journaled through the access aperture 70 and secure to the exemplary trailer 99 in order to secure the object. The access aperture 70 has a flap 72 disposed thereover wherein the flap 72 is secured along the upper edge 74 and unattached at the lower edge 76. The aforementioned configuration of the flap 72 is configured so as to inhibit the entrance of precipitation into the interior volume of the body 10 subsequent a rope or strap being journaled through the access aperture 70 in order to secure an object disposed within the interior volume of the body 10. It should be understood within the scope of the present invention that the body 10 could have as few as one access aperture 70 or more than one access aperture 70. Furthermore, it should be understood that the access aperture 70 could be provided in alternate sizes in order to accommodate different restraints being journaled therethrough.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A weatherproof container configured to be secured within an open style utility trailer so as to provide protection of objects disposed therein wherein the weather proof container comprises:
    a body, said body having a plurality of walls, said plurality of walls defining a height of the body, a bottom and a top being integrally formed with said plurality of walls to create an interior volume, said body having a lower section and an upper section, said lower section and said upper section being contiguous;
    a plurality of expansion sections, said plurality of expansion sections being circumferentially disposed on said plurality of walls of said body, said plurality of expansion sections including an upper perimeter edge and a lower perimeter edge, said plurality of expansion sections being configured to have a first position and a second position, said plurality of expansion sections having fasteners secured to said upper perimeter edge and said lower perimeter edge, said fasteners operable to transition the plurality of expansion sections intermediate the first position and the second position, said plurality of expansion sections further including an expansion member, said expansion member extending intermediate said upper perimeter edge and said lower perimeter edge of said plurality of expansion sections, said expansion member being moved to an extended position when said plurality of expansion sections are moved to said second position so as to increase the height of said body, wherein said plurality of expansion members extend around an entire perimeter of said body; and
    a plurality of access apertures, said plurality of access apertures being journaled through said plurality of walls, said plurality of access apertures being configured to have a tie down member journaled therethrough.

2. The weatherproof container as recited in claim 1, wherein each of said plurality of said expansion sections provides an increase in height of approximately two feet.

3. The weatherproof container as recited in claim 2, and further including a plurality of tie down members, said tie down members being present on said bottom of said body, said tie down members configured to secure said body to a utility trailer.

4. The weatherproof container as recited in claim 3, wherein in said first position said plurality of expansion members are closed such that the upper perimeter edge and the lower perimeter edge are adjacent in order to decrease the height of said body.

5. The weatherproof container as recited in claim 4, and further including a plurality of reinforcement straps, said plurality of reinforcement straps being integrally secured to the top of said body, said plurality of reinforcement straps extending intermediate opposing sides of said top, said plurality of reinforcement straps having a keeper secured thereto.

6. The weatherproof container as recited in claim 5, wherein said body further includes at least one access seam, said at least one access seam extending intermediate said top and said bottom, said at least one access seam configured to provide entry into the interior volume of said body.

7. A weatherproof container configured to be secured within an open style utility trailer so as to provide protection of objects disposed therein wherein the weather proof container comprises:
    a body, said body having a plurality of walls, said plurality of walls defining a height of the body, a bottom and a top being integrally formed with said plurality of walls to create an interior volume, said body having a lower section and an upper section, said lower section and said upper section being contiguous,
    a plurality of expansion sections, said plurality of expansion sections being circumferentially disposed on said plurality of walls of said body, said plurality of expansion sections including an upper perimeter edge and a lower perimeter edge, said plurality of expansion sections being configured to have a first position and a second position, said plurality of expansion sections having fasteners secured to said upper perimeter edge and said lower perimeter edge, said fasteners operable to transition the plurality of expansion sections intermediate the first position and the second position, said plurality of expansion sections further including an expansion member, said expansion member extending intermediate said upper perimeter edge and said lower perimeter edge of said plurality of expansion sections, said expansion member being moved to an extended position when said plurality of expansion sections are moved to said second position so as to increase the height of said body, wherein said plurality of expansion members extend around an entire perimeter of said body;

a plurality of access apertures, said plurality of access apertures being journaled through said plurality of walls, said plurality of access apertures being configured to have a tie down member journaled therethrough;

at least one access seam, said at least one access seam extending intermediate said top and said bottom, said at least one access seam configured to provide entry into the interior volume of said body; and a plurality of reinforcement straps, said plurality of reinforcement straps being integrally secured to the top of said body, said plurality of reinforcement straps extending intermediate opposing sides of said top, said plurality of reinforcement straps having a keeper secured thereto.

8. The weatherproof container as recited in claim 7, wherein in said first position said plurality of expansion members are closed such that the upper perimeter edge and the lower perimeter edge are adjacent in order to decrease the height of said body.

9. The weatherproof container as recited in claim 8, and further including a plurality of tie down members, said tie down members being present on said bottom of said body, said tie down members configured to secure said body to a utility trailer.

10. The weatherproof container as recited in claim 9, wherein each of said plurality of said expansion sections provides an increase in height of approximately two feet.

11. The weatherproof container as recited in claim 10, wherein said fasteners along said upper perimeter edge and said lower perimeter edge of said plurality of expansion sections are zippers.

* * * * *